United States Patent
Teo (10) Patent No.: US 9,081,662 B2
(45) Date of Patent: Jul. 14, 2015

(54) MEMORY STORAGE DEVICE, MEMORY CONTROLLER THEREOF, AND METHOD FOR PROGRAMMING DATA THEREOF

(75) Inventor: Wei-Chen Teo, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 692 days.

(21) Appl. No.: 13/287,101

(22) Filed: Nov. 1, 2011

(65) Prior Publication Data
US 2013/0036258 A1 Feb. 7, 2013

(30) Foreign Application Priority Data
Aug. 5, 2011 (TW) ............................. 100127947 A (51) Int. Cl.
  G06F 12/00 (2006.01)
  G06F 12/02 (2006.01)
  G06F 12/06 (2006.01)
(52) U.S. Cl.
  CPC ............ G06F 12/0246 (2013.01); *G06F 12/02* (2013.01); *G06F 12/0646* (2013.01); *G06F 2212/7202* (2013.01); *G06F 2212/7203* (2013.01)
(58) Field of Classification Search
  CPC ............................ G06F 12/02; G06F 12/0638
  See application file for complete search history.

(56) References Cited

U.S. PATENT DOCUMENTS

| | | | |
|---|---|---|---|
| 2007/0233937 A1* | 10/2007 | Coulson et al. | 711/103 |
| 2009/0164704 A1* | 6/2009 | Kanade et al. | 711/103 |
| 2009/0164750 A1* | 6/2009 | Atri et al. | 711/209 |
| 2009/0198875 A1* | 8/2009 | Chu et al. | 711/103 |

* cited by examiner

*Primary Examiner* — Cheng-Yuan Tseng
*Assistant Examiner* — Arvind Talukdar
(74) *Attorney, Agent, or Firm* — Jianq Chyun IP Office (57) ABSTRACT

A memory storage device, a memory controller thereof, and a method for programming data thereof are provided. The memory storage device includes a buffer memory and a rewritable non-volatile memory chip, wherein the rewritable non-volatile memory chip includes a buffer unit and a plurality of physical blocks. The method includes storing first data received from a host system into the buffer memory, and generating a writing complete message for replying to the host system after the first data stored in the buffer memory is transmitted to the buffer unit by using a first data transmitting command. The method further includes programming the first data to a first physical block of the physical blocks. Meanwhile, if a data program failure is detected, the method also includes programming the first data maintained in the buffer unit to a second physical block by using a second data transmitting command.

15 Claims, 7 Drawing Sheets

MEMORY STORAGE DEVICE, MEMORY CONTROLLER THEREOF, AND METHOD FOR PROGRAMMING DATA THEREOF

CROSS-REFERENCE TO RELATED APPLICATION

This application claims the priority benefit of Taiwan application serial no. 100127947, filed on Aug. 5, 2011. The entirety of the above-mentioned patent application is hereby incorporated by reference herein and made a part of this specification.

BACKGROUND OF THE INVENTION

1. Field of the Invention

The invention relates to an error handling method of a memory storage device. Particularly, the invention relates to a method for handling program failure, a memory storage device and a memory controller implementing the same.

2. Description of Related Art

Since a flash memory has characteristics of data non-volatility, low power consumption, small volume and non-mechanical structure, etc., it is widely used in various electronic devices. A storage device such as a memory card, a flash drive or a solid state disk, etc. in the market generally uses the flash memory as its storage medium.

Figure 1:
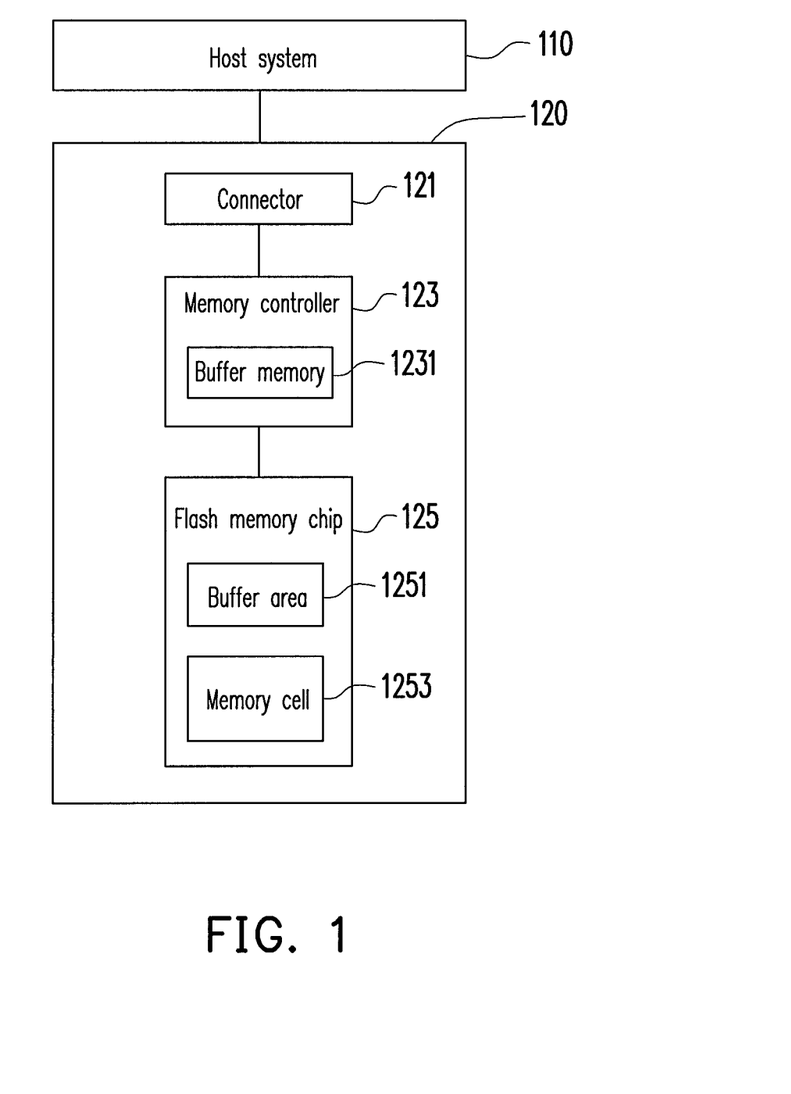
FIG. 1 is a schematic block diagram of a conventional flash memory storage device.

FIG. 1 is a schematic block diagram of a conventional flash memory storage device. As shown in FIG. 1, a host system 110 is coupled to the flash memory storage device 120 through a connector 121, so as to read data stored in the flash memory storage device 120 or program data into the flash memory storage device 120. Generally, when the host system 110 wants to program data into the flash memory storage device 120, the data to be written is first written into a buffer memory 1231 of a memory controller 123. Then, the memory controller 123 transmits the data in the buffer memory 1231 to a buffer area 1251 of a flash memory chip 125, and controls the flash memory chip 125 to program data in the buffer area 1251 into a memory cell 1253. After the flash memory chip 125 replies a message indicating that the data has been correctly programmed into the memory cell 1253 to the memory controller 123, the memory controller 123 notifies the host system 100 that the data program operation is completed. When the flash memory chip 125 replies a message indicating a data program failure, the memory controller 123 notifies an error message to the host system 100, and requests the host system 100 to again transmit such batch of data to the memory controller 123. Before the host system 110 receives the notification from the memory controller 123, it cannot send other commands to the flash memory storage device 120. Therefore, the host system 110 has to spend time in waiting for correctly writing data into the memory cell 1253, which may decrease a data processing speed between the host system 110 and the flash memory storage device 120. Therefore, it is a target pursued by those skilled in the art to improve the data processing speed while considering saving the cost.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, the invention is directed to a method for programming data, a memory controller and a memory storage device, which can effectively handle error occurred when data is written into the memory storage device.

The invention provides a method for programming data, adapted to a memory storage device. The memory storage device includes a buffer memory and a rewritable non-volatile memory chip, wherein the rewritable non-volatile memory chip includes a buffer unit and a plurality of physical blocks. The method includes storing first data received from a host system into the buffer memory, and generating a writing complete message for replying to the host system after the first data stored in the buffer memory is transmitted to the buffer unit by using a first data transmitting command. The method further includes programming the first data in the buffer unit to a first physical block of the physical blocks, and determining whether the first data in the buffer unit is failed to be programmed to the first physical block. If a data program failure is detected, the method also includes programming the first data maintained in the buffer unit to a second physical block of the physical blocks by using a second data transmitting command, where the first data transmitting command is different to the second data transmitting command, and the second data transmitting command does not clear the first data in the buffer unit.

According to another aspect, the invention provides a memory controller, adapted to manage a rewritable non-volatile memory chip in a memory storage device. The memory controller includes a host system interface, a memory interface, a buffer memory and a memory management circuit. The host system interface is coupled to a host system. The memory interface is coupled to the rewritable non-volatile memory chip, and the rewritable non-volatile memory chip includes a buffer unit and a plurality of physical blocks. The memory management circuit is coupled to the host system interface, the memory interface and the buffer memory, and the memory management circuit is used for storing first data received from the host system into the buffer memory, transmitting the first data in the buffer memory to the buffer unit by using a first data transmitting command, and controlling the rewritable non-volatile memory chip to program the first data in the buffer unit to a first physical block of the physical blocks. The memory management circuit generates a writing complete message for replying to the host system after the first data is transmitted to the buffer unit. When the rewritable non-volatile memory chip programs the first data in the buffer unit to the first physical block, it detects whether a data program failure is occurred, and when the data program failure is detected, the memory management circuit controls the rewritable non-volatile memory chip to program the first data maintained in the buffer unit to a second physical block of the physical blocks by using a second data transmitting command, where the first data transmitting command is different to the second data transmitting command, and the second data transmitting command does not clear the first data in the buffer unit.

According to another aspect, the invention provides a memory storage device including a rewritable non-volatile memory chip, a connector and a memory controller. The rewritable non-volatile memory chip includes a buffer unit and a plurality of physical blocks. The connector is coupled to a host system. The memory controller is coupled to the rewritable non-volatile memory chip and the connector, and includes a buffer memory. The memory controller is used for storing first data received from the host system into the buffer memory, transmitting the first data stored in the buffer memory to the buffer unit by using a first data transmitting command, and controlling the rewritable non-volatile memory chip to program the first data in the buffer unit to a first physical block of the physical blocks. The memory controller generates a writing complete message for replying to the host system after the first data is transmitted to the buffer unit. When the rewritable non-volatile memory chip programs the first data in the buffer unit to the first physical block, it detects whether a data program failure is occurred, and when the data program failure is detected, the memory controller controls the rewritable non-volatile memory chip to program the first data maintained in the buffer unit to a second physical block of the physical blocks by using a second data transmitting command, where the first data transmitting command is different to the second data transmitting command, and the second data transmitting command does not clear the first data in the buffer unit.

According to the above descriptions, in the invention, two different data transmitting commands are used to program data into the physical block of the rewritable non-volatile memory chip. In case of data program failure, the data transmitting command that does not clear the buffer unit of the rewritable non-volatile memory chip is used to quickly program the data maintained in the buffer unit to another physical block. Moreover, the host system can send another write command before a write command is completed, so as to improve a data programming speed of the memory storage device.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (which is also referred to as a memory storage system) includes a memory chip and a controller (which is also referred to as a control circuit). The memory storage device is generally used together with a host system so that the host system can write data into the memory storage device or read data from the memory storage device. Moreover, the memory storage device may also include an embedded memory and software capable of being executed on the host system to substantially serving as a controller of the embedded memory.

Figure 2A:
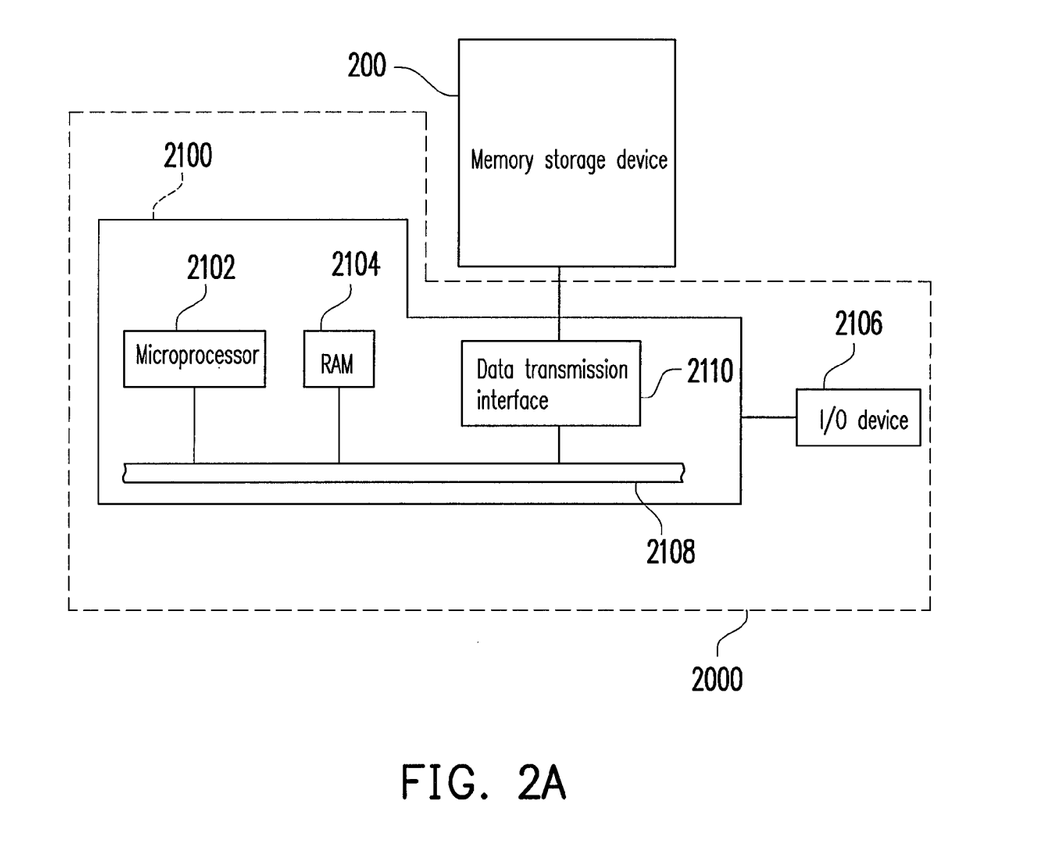
FIG. 2A is a schematic diagram illustrating a host system using a memory storage device according to an exemplary embodiment of the present invention.

FIG. 2A is a schematic diagram illustrating a host system using a memory storage device according to an exemplary embodiment of the present invention.

Figure 2B:
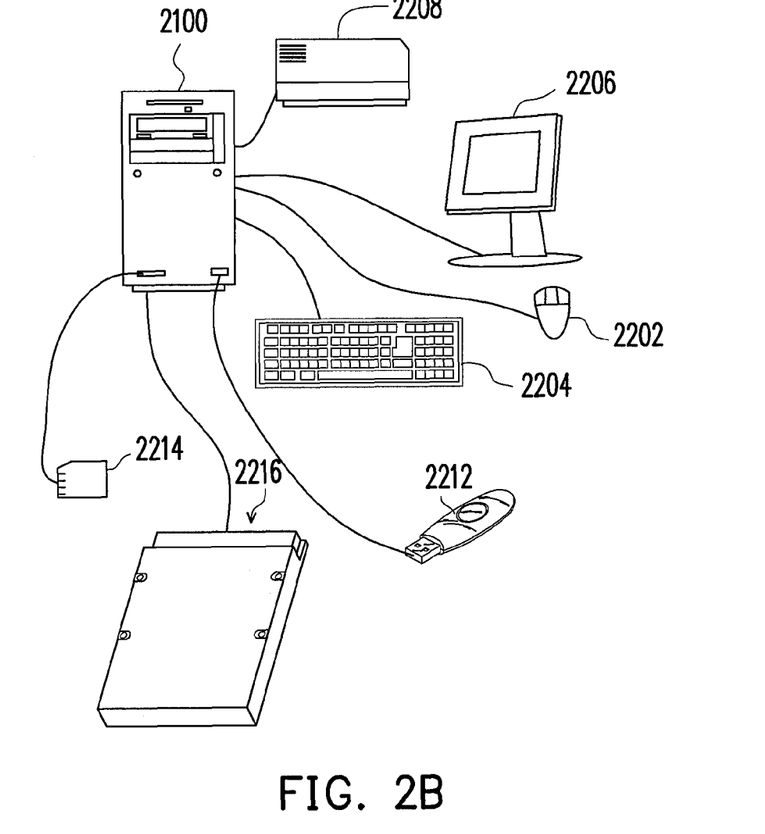
FIG. 2B is a schematic diagram illustrating a computer, input/output devices and a memory storage device according to an exemplary embodiment of the present invention.

The host system 2000 includes a computer 2100 and an input/output (I/O) device 2106. The computer 2100 includes a microprocessor 2102, a random access memory (RAM) 2104, a system bus 2108 and a data transmission interface 2110. The I/O device 2106 includes a mouse 2202, a keyboard 2204, a display 2206 and a printer 2208 shown in FIG. 2B. It should be noticed that the devices shown in FIG. 2B are not used to limit to the I/O device 2106, and the I/O device 2106 may also include other devices.

In the present exemplary embodiment, the memory storage device 200 is coupled to the other devices of the host system 2000 through the data transmission interface 2110. Based on operations of the microprocessor 2102, the RAM 2104, and the I/O device 2106, the host system 2000 can write data into the memory storage device 200 or read data from the memory storage device 200. For example, the memory storage device 200 may be a memory card 2214, a flash drive 2212, or a solid state drive (SSD) 2216 shown in FIG. 2B.

Figure 2C:
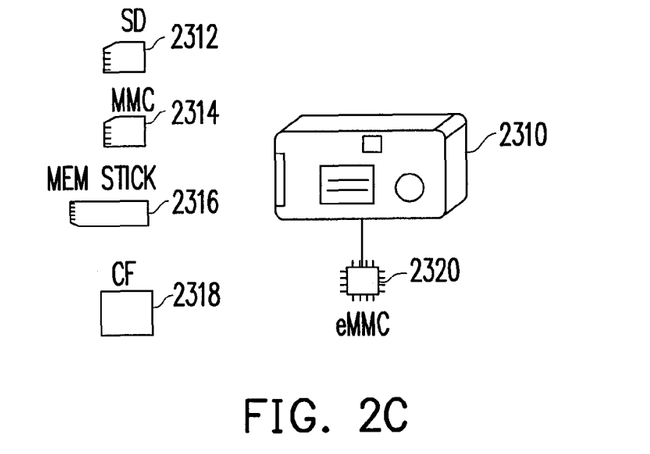
FIG. 2C is a schematic diagram illustrating a host system and memory storage device according to another exemplary embodiments of the present invention.

Generally, the host system 2000 can be any system capable of storing data. In the present exemplary embodiment, although the host system 2000 implemented by a computer system is taken as an example, in another exemplary embodiment of the present invention, the host system 2000 can also be a digital camera, a video camera, a communication device, an audio player or a video player, etc. For example, when the host system is a digital camera 2310, the memory storage device is a secure digital (SD) card 2312, a multimedia card (MMC) card 2314, a memory stick (MS) 2316, a compact flash (CF) card 2318 or an embedded storage device 2320 (shown in FIG. 2C). The embedded storage device 2320 includes an embedded MMC (eMMC). It should be noticed that the embedded eMMC is directly coupled to a motherboard of the host system.

Figure 3:
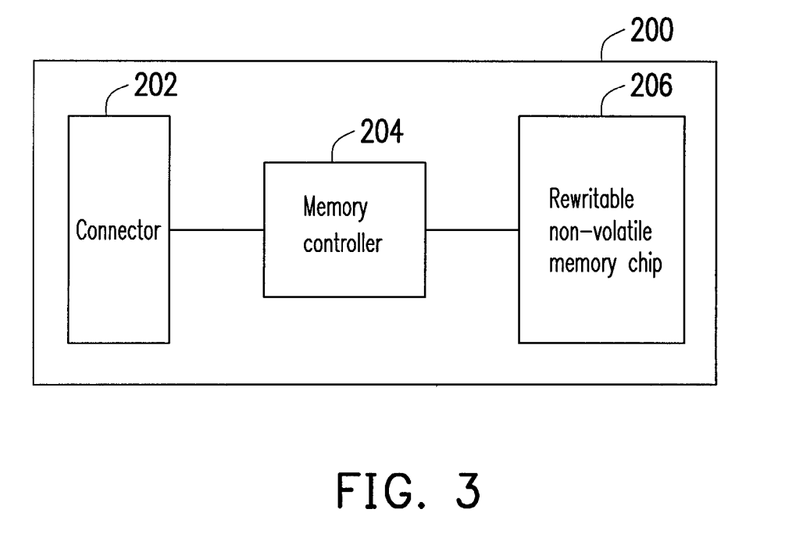
FIG. 3 is a schematic block diagram of the memory storage device of FIG. 2A.

FIG. 3 is a schematic block diagram of the memory storage device 200 of FIG. 2A. Referring to FIG. 3, the memory storage device 200 includes a connector 202, a memory controller 204 and a rewritable non-volatile memory chip 206.

The connector 202 is coupled to the memory controller 204 and configured to couple to the host system 2000. In the present exemplary embodiment, a type of transmission interface supported by the connector 202 is a serial advanced technology attachment (SATA) interface, though the invention is not limited thereto, and the type of the transmission interface of the connector 202 can also be a universal serial bus (USB) interface, a MMC interface, a parallel advanced technology attachment (PATA) interface, an institute of electrical and electronic engineers (IEEE) 1394 interface, a peripheral component interconnect express (PCI express) interface, a secure digital (SD) interface, a memory stick (MS) interface, a compact flash (CF) interface, an integrated drive electronics (IDE) interface or other suitable interfaces, which is not limited by the invention.

The memory controller 204 may execute a plurality of logic gates or control instructions implemented by a hardware form or a firmware form, and may perform a program operation, a read operation or an erase operation on the rewritable non-volatile memory chip 206 according to operation commands issued by the host system 2000. The memory controller 204 can further handle a situation of data writing error according to a method for programming data of the present exemplary embodiment. The method for programming data of the present exemplary embodiment is described later with reference of figures.

The rewritable non-volatile memory chip 206 is coupled to the memory controller 204. For example, the rewritable non-volatile memory chip 206 is a multi level cell (MLC) NAND flash memory chip. However, the present invention is not limited thereto, and the rewritable non-volatile memory module 206 can also be a single level cell (SLC) NAND flash memory chip, other flash memory chips or other memory chips having the same characteristic.

Figure 4:
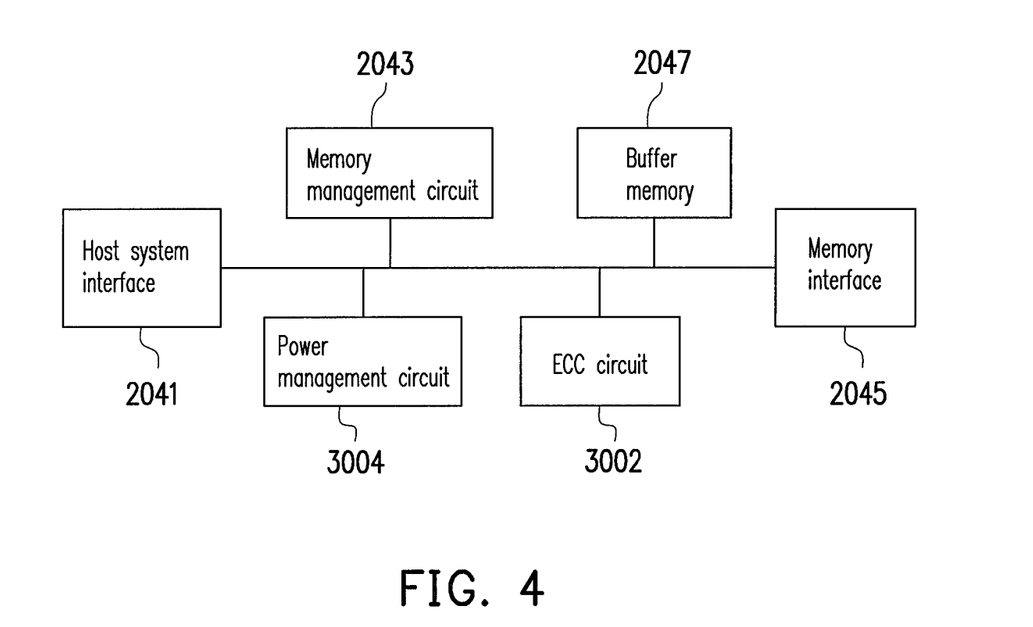
FIG. 4 is a schematic block diagram of a memory controller according to an exemplary embodiment of the invention.

FIG. 4 is a schematic block diagram of a memory controller according to an exemplary embodiment of the invention. Referring to FIG. 4, the memory controller 204 includes a host system interface 2041, a memory management circuit 2043, a memory interface 2045 and a buffer memory 2047.

The host system interface 2041 is coupled to the memory management circuit 2043, and is coupled to the host system 2000 through the connector 202. The host system interface 2041 is used for receiving and identifying commands and data transmitted by the host system 2000. The commands and data transmitted by the host system 2000 are transmitted to the memory management circuit 2043 through the host system interface 2041. In the present exemplary embodiment, the host system interface 2041 is the SATA interface corresponding to the connector 202, and in other exemplary embodiments, the host system interface 2041 can also be the USB interface, the MMC interface, the PATA interface, the IEEE 1394 interface, the PCI express interface, the SD interface, the MS interface, the CF interface, the IDE interface or other suitable data transmission interfaces.

The memory management circuit 2043 is used for controlling a whole operation of the memory controller 204. In detail, the memory management circuit 2043 has a plurality of control instructions, and when the memory storage device 200 is in operation, the control instructions are executed to implement the method for programming data of the present exemplary embodiment.

In an exemplary embodiment, the control instructions of the memory management circuit 2043 are implemented by a firmware form. For example, the memory management circuit 2043 has a microprocessor unit (not shown) and a read-only memory (not shown), and these control instructions are burnt into the read-only memory. When the memory storage apparatus 200 is in operation, these control instructions are executed by the microprocessor unit to accomplish the method for programming data of the present exemplary embodiment.

In another exemplary embodiment, the control instructions of the memory management circuit 2043 may also be stored in a specific area of the rewritable non-volatile memory module 206 (for example, a system area used for storing system data in the rewritable non-volatile memory chip 206) in form of program codes. Moreover, the memory management circuit 2043 has a microprocessor unit (not shown), a read-only memory (not shown) and a random access memory (RAM) (not shown). Particularly, the read-only memory has a driving code, and when the memory controller 204 is enabled, the microprocessor unit first executes the driving code to load the control instructions stored in the rewritable non-volatile memory chip 206 to the RAM of the memory management circuit 2043. Then, the microprocessor unit executes these control instructions to implement the method for programming data of the present exemplary embodiment. Moreover, in another exemplary embodiment of the present invention, the control instructions of the memory management circuit 2043 can also be implemented in a hardware form.

The memory interface 2045 is coupled to the memory management circuit 2043 for connecting the memory controller 204 and the rewritable non-volatile memory chip 206. In this way, the memory controller 204 can perform related operations on the rewritable non-volatile memory chip 206. Namely, data to be written into the rewritable non-volatile memory chip 206 is converted into a format that can be accepted by the rewritable non-volatile memory chip 206 through the memory interface 2045.

The memory controller 204 further includes the buffer memory 2047. The buffer memory 2047 may be a static random access memory (SRAM), or a dynamic random access memory (DRAM), etc., which is not limited by the invention. The buffer memory 2047 is coupled to the memory management circuit 2043 for temporarily storing data from the host system 2000, or temporarily storing data from the rewritable non-volatile memory chip 206.

In anther exemplary embodiment of the invention, an error checking and correcting (ECC) circuit 3002 is coupled to the memory management circuit 2043 and is configured to execute an error checking and correcting procedure to ensure correctness of data. In detail, when the memory management circuit 2043 receives a write command from the host system 2000, the ECC circuit 3002 generates a corresponding error checking and correcting code (ECC code) for data corresponding to the write command, and the memory management circuit 2043 writes the data corresponding to the write command and the corresponding ECC code together to the rewritable non-volatile memory chip 206. Then, when the memory management circuit 2043 reads data from the rewritable non-volatile memory chip 206, it simultaneously reads the ECC code corresponding to the data, and the ECC circuit 3002 executes the error checking and correcting procedure on the read data according to the ECC code.

In another exemplary embodiment of the invention, the memory controller 204 further includes a power management circuit 3004. The power management circuit 3004 is coupled to the memory management circuit 2043, and is used for controlling a power of the memory storage device 200.

Figure 5:
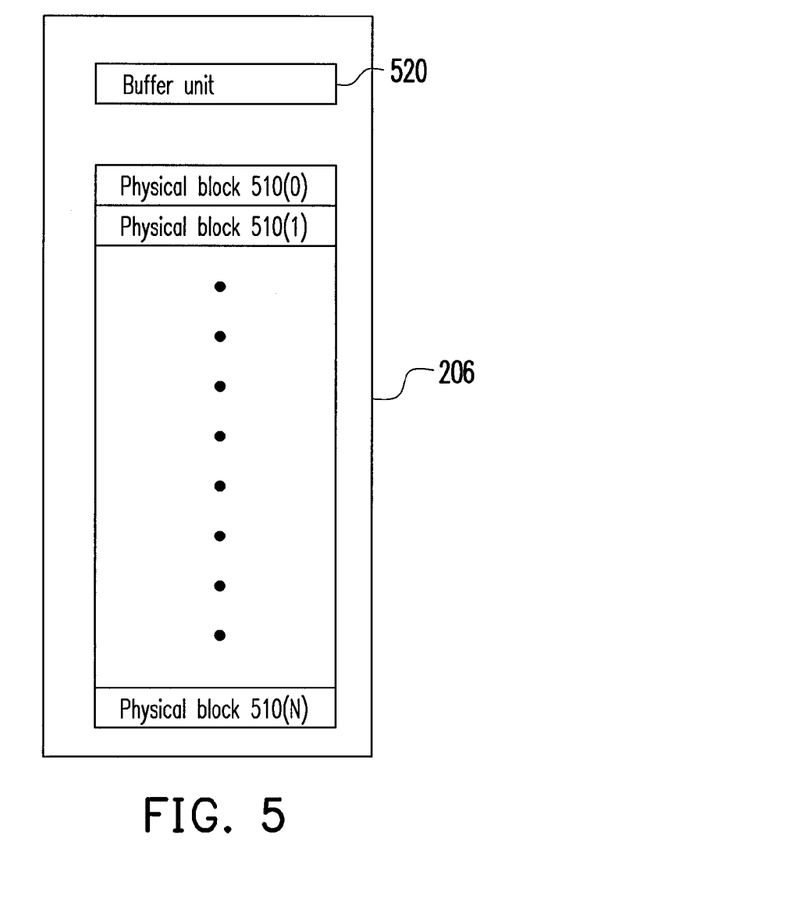
FIG. 5 is a schematic block diagram illustrating a rewritable non-volatile memory chip according to an exemplary embodiment of the present invention.

FIG. 5 is a schematic block diagram illustrating a rewritable non-volatile memory chip according to an exemplary embodiment of the present invention. Referring to FIG. 5, the rewritable non-volatile memory chip 206 includes a plurality of physical blocks 510(0)-510(N) and a buffer unit 520, where N is a positive integer and each physical block includes a plurality of physical pages. In the present exemplary embodiment, a size of the buffer unit 520 is, for example, equal to a size of a physical page. Since the physical page is taken as a unit for writing the rewritable non-volatile memory chip 206, and the physical block is taken as a unit for erase operation, the physical blocks 510(0)-510(N) included in the rewritable non-volatile memory chip 206 store data in an alternation manner. In detail, the memory management circuit 2043 in the memory controller 204 logically groups the physical blocks 510(0)-510(N) in the rewritable non-volatile memory chip 206 into a data area, a spare area, a system area and a replacement area.

The physical blocks logically belonging to the data area and the spare area are used for storing data from the host system 2000. In detail, the physical blocks in the data area are regarded as physical blocks already stored with data, and the physical blocks in the spare area are used for substituting the physical blocks of the data area. In other words, the physical blocks in the spare area are empty or usable physical blocks (i.e. physical blocks that are not stored with data or physical blocks stored with data marked to be invalid). When a write command and data to be written are received from the host system 2000, the memory management circuit 2043 selects a physical block from the spare area, and write the data into the selected physical block to substitute the physical block of the data area.

The physical blocks logically belonging to the system area are used for storing system data. For example, the system data includes information such as the manufacturer and model of the rewritable non-volatile memory chip 206.

The physical blocks logically belonging to the replacement area are used for replacing damaged physical blocks when the physical blocks in the data area, the spare area or the system area are damaged. In detail, when the replacement area still has normal physical blocks and some physical blocks in the data area are damaged, the memory management circuit 2043 selects the normal physical blocks from the replacement area to replace the damaged physical blocks in the data area.

To facilitate the host system 2000 accessing the rewritable non-volatile memory chip 206, the memory management circuit 2043 configures a plurality of logical blocks for mapping to the physical blocks of the data area, where each logical block has a plurality of logical pages, and the logical pages in the logical blocks are sequentially mapped to the physical pages of the physical blocks of the data area.

In detail, the memory management circuit 2043 provides the configured logical blocks to the host system 2000, and maintains a logical block-physical block mapping table to record a mapping relationship between the logical blocks and the physical blocks belonging to the data area. Therefore, when the host system 2000 is about to access a certain logical access address, the memory management circuit 2043 converts the logical access address into logical pages of the corresponding logical block, and accesses data of the corresponding physical pages according to the logical block-physical block mapping table.

The buffer unit 520 is used to temporarily storing data transmitted between the memory controller 204 and the physical blocks of the rewritable non-volatile memory chip 206. In the present exemplary embodiment, when the host system 2000 sends a write command for programming data into the memory storage device 200, the programming data is first stored in the buffer memory 2047 of the memory controller 204, temporarily. Then, the memory management circuit 2043 transmits the programming data in the buffer memory 2047 to the buffer unit 520, and controls the rewritable non-volatile memory chip 206 to program the programming data in the buffer unit 520 to a certain physical block of the physical blocks 510(0)-510(N).

Figure 6:
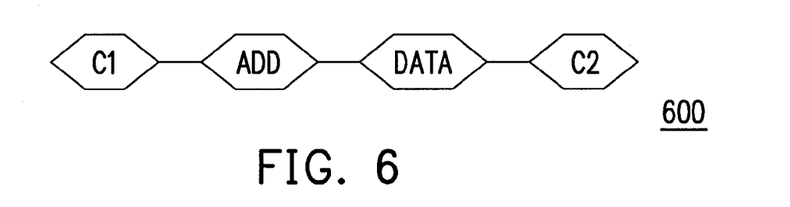
FIGS. 6-7 are schematic diagrams of commands sent to a rewritable non-volatile memory chip by a memory management circuit according to an exemplary embodiment of the present invention.

In detail, the memory management circuit 2043 sends a first data transmitting command 600 shown in FIG. 6 to the rewritable non-volatile memory chip 206. Referring to FIG. 6, the first data transmitting command 600 is composed of a command C1, a physical address ADD, data DATA and a command C2. In order to transmit the programming data to the buffer unit 520, the memory management circuit 2043 first clears the buffer unit 520 through the command C1 (i.e. data originally stored in the buffer unit 520 is cleared). The physical address ADD represents a start physical address where the programming data is to be programmed, and the memory management circuit 2043 can obtain the starting physical address according to the logical access address corresponding to the write command come from the host system 2000 and the logical block-physical block mapping table. The data DATA represents a content of the programming data. The command C2 is used for commanding the rewritable non-volatile memory chip 206 to program the programming data transmitted to the buffer unit 520 to a certain physical block of the physical blocks 510(0)-510(N) according to the physical address ADD.

After the rewritable non-volatile memory chip 206 receives the command C2, it starts to program the programming data in the buffer unit 520 to the physical block. If data program failure is not occurred during such process (i.e. the programming data is correctly programmed to a certain physical block), the rewritable non-volatile memory chip 206 generates a message indicating program success to notify the memory management circuit 2043 that the data program operation is successful. In detail, in the present exemplary embodiment, after the programming data is correctly programmed into the physical block, the rewritable non-volatile memory chip 206 can modify a content of a status register or modify a state of a ready/busy pin to indicate the program success. Then, when the memory management circuit 2043 wants to confirm a program state, it sends a command to read the status register or the ready/busy pin, and determines that the program operation is successful according to the content of the status register or the state of the ready/busy pin. By now, the write command sent by the host system 2000 is completed.

Figure 7:
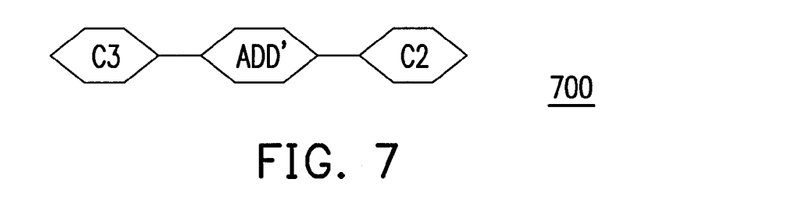

However, when the rewritable non-volatile memory chip 206 detects the data program failure during the process of programming the programming data of the buffer unit 520 to the physical block, the rewritable non-volatile memory chip 206 generates an error message for the memory management circuit 2043 to identify the data program failure while confirming the program state. Then, the memory management circuit 2043 controls the rewritable non-volatile memory chip 206 to program the programming data still maintained in the buffer unit 520 to another physical block of the physical blocks 510(0)-510(N). For example, the memory management circuit 2043 may send a second data transmitting command 700 shown in FIG. 7 to the rewritable non-volatile memory chip 206. As shown in FIG. 7, the second data transmitting command 700 is composed of a command C3, a physical address ADD' and the command C2. The command C3 does not clear the buffer unit 520, so that the programming data already transmitted to the buffer unit 520 is maintained in the buffer unit 520, namely, the memory management circuit 2043 is unnecessary to again transmit the programming data. The physical address ADD' represents a start physical address where the programming data is to be programmed. The command C2 is used for commanding the rewritable non-volatile memory chip 206 to program the programming data in the buffer unit 520 to another physical block of the physical blocks 510(0)-510(N) according to the physical address ADD'.

In the present exemplary embodiment, the rewritable non-volatile memory chip 206 programs the programming data in the buffer unit 520 into a certain physical block of the physical blocks 510(0)-510(N) in response to the first data transmitting command sent by the memory management circuit 2043, during which if the data program failure is occurred, the memory management circuit 2043 sends the second data transmitting command that does not clear the buffer unit 520 to the rewritable non-volatile memory chip 206, and continually completes the data program operation by using the programming data still maintained in the buffer unit 520.

It should be noticed that the data program failure refers to program failure of a physical page, where the program failure refers to that the data program operation is failed or the programmed data has an error. Once the data program failure is detected, the physical block containing the physical page where the program failure is occurred cannot be used for programming data. Therefore, all valid data in such physical block (i.e. data already programmed to the physical block before the programming data is programmed to the physical block) are required to be programmed to another physical block.

Figure 8A:
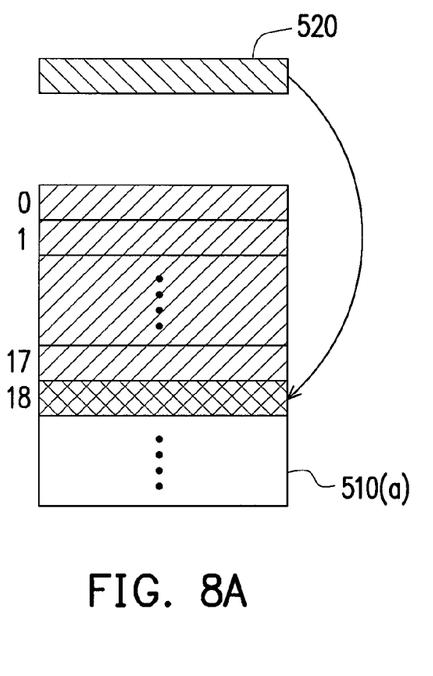
FIGS. 8A-8C are operation schematic diagrams of a rewritable non-volatile memory chip according to an exemplary embodiment of the invention.
Figure 8B:
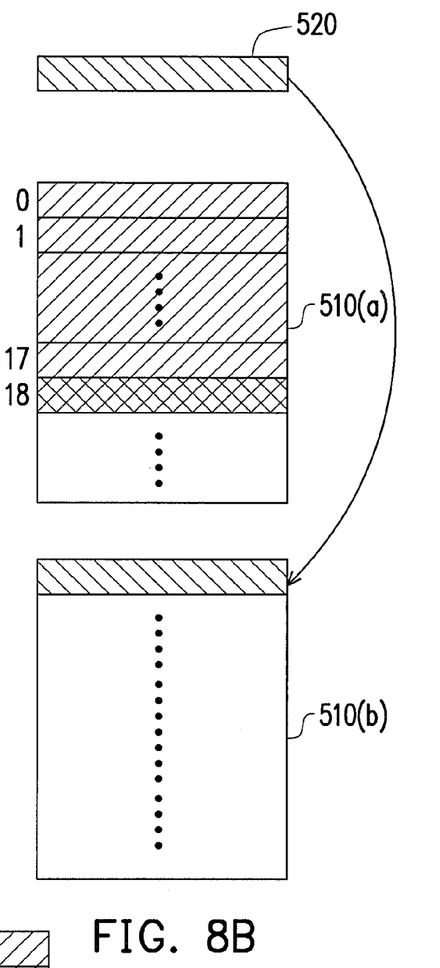
Figure 8C:
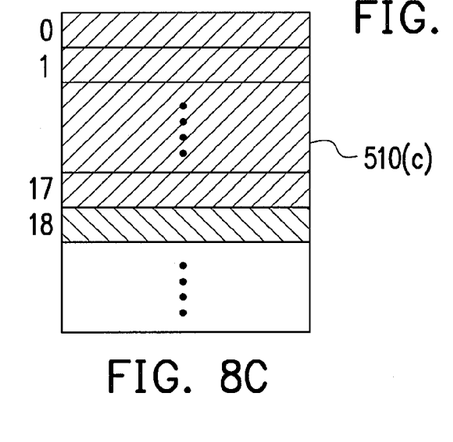

FIGS. 8A-8C are operation schematic diagrams of the rewritable non-volatile memory chip according to an exemplary embodiment of the invention. As shown in FIG. 8A, it is assumed that the rewritable non-volatile memory chip 206 programs the programming data in the buffer unit 520 to an $18^{th}$ physical page in a physical block 510(a) in response to the command of the memory management circuit 2043. Meanwhile, if the data program failure is occurred, the rewritable non-volatile memory chip 206 generates an error message and provides it to the memory management circuit 2043 for confirmation. After the memory management circuit 2043 confirms the error message, it may send the command of FIG. 7 to the rewritable non-volatile memory chip 206. As shown in FIG. 8B, the rewritable non-volatile memory chip 206 again programs the programming data maintained in the buffer unit 520 to another physical block (for example, a $0^{th}$ physical page of a physical block 510(b)) in response to the command of the memory management circuit 2043. After the memory management circuit 2043 detects the status information provided by the rewritable non-volatile memory chip 206 and confirms that the aforementioned operation is completed, the memory management circuit 2043 commands the rewritable non-volatile memory chip 206 to program all valid data in the physical block 510(a) (i.e. data recorded in $0^{th}$-$17^{17}$ physical pages) and the programming data programmed to the $0^{th}$ physical page of the physical block 510(b) all together to another physical block (for example, a physical block 510(c) shown in FIG. 8C). After the above operation is completed, the physical block 510(a) and the physical block 510(b) can be associated to the spare area for post utilization.

In the present exemplary embodiment, once the memory management circuit 2043 transmits the programming data in the buffer memory 2047 to the buffer unit 520, the memory management circuit 2043 generates a writing complete message to the host system 2000, so as to quickly reply the host system 2000 that the write command sent by the host system 2000 has been completed. However, it should be noticed that after the memory management circuit 2043 transmits the programming data in the buffer memory 2047 to the buffer unit 520, the rewritable non-volatile memory chip 206 is in a busy state, and the host system 2000 cannot access data of the rewritable non-volatile memory chip 206 when the rewritable non-volatile memory chip 206 is in the busy state.

However, since the memory management circuit 2043 clears the buffer memory 2047 after transmitting the programming data in the buffer memory 2047 to the buffer unit 520, if the host system 2000 sends a new write command when the rewritable non-volatile memory chip 206 is still in the busy state, the memory management circuit 2043 first temporarily stores programming data corresponding to the new write command to the buffer memory 2047. Then, when the rewritable non-volatile memory chip 206 leaves the busy state, the memory management circuit 2043 programs the new programming data in the buffer memory 2047 into the rewritable non-volatile memory chip 206 by using the first data transmitting command.

For simplicity's sake, the programming data already transmitted to the buffer unit 520 is referred to as first data hereinafter. During the process that the rewritable non-volatile memory chip 206 programs the first data in the buffer unit 520 to a certain physical block, if the host system 2000 sends the new write command to program second data to the rewritable non-volatile memory chip 206, the memory management circuit 2043 temporarily stores the second data received from the host system 2000 to the buffer memory 2047, and waits for the rewritable non-volatile memory chip 206 to leave the busy state (i.e. complete the operation of programming the first data into a physical block), and then clears the first data stored in the buffer unit 520 by using the first data transmitting command, and transmits the second data in the buffer memory 2047 to the buffer unit 520. Since a method for programming the second data into the physical block of the rewritable non-volatile memory chip 206 is the same or similar as that described above, details thereof are not repeated.

Figure 9:
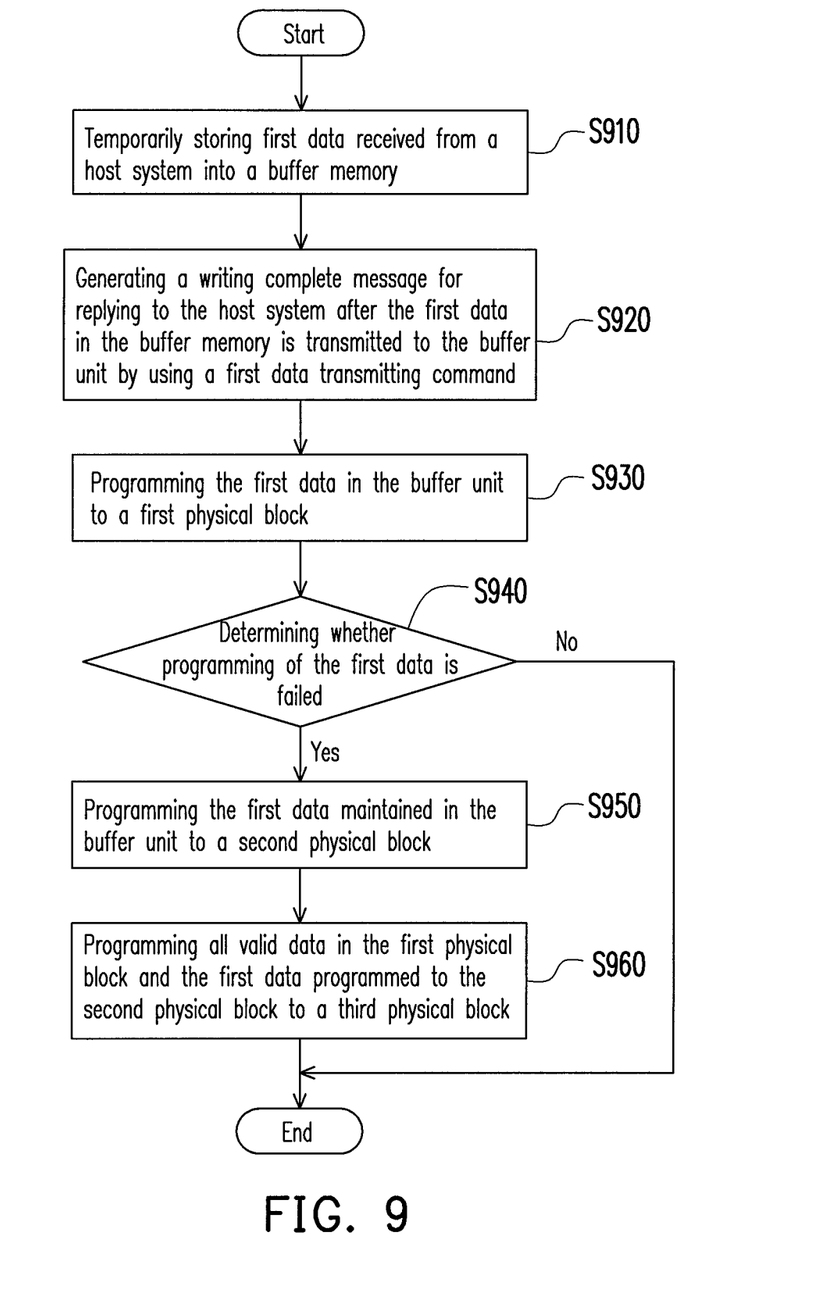
FIG. 9 is a flowchart illustrating a method for programming data according to an exemplary embodiment of the invention.

FIG. 9 is a flowchart illustrating a method for programming data according to an exemplary embodiment of the invention.

Referring to FIG. 9, when the host system 2000 wants to program the first data to the memory storage device 200, in step S910, the memory management circuit 2043 receives the first data from the host system 2000 through the host system interface 2041 and the connector 202, and temporarily stores the first data to the buffer memory 2047.

In step S920, after the memory management circuit 2043 transmits the first data in the buffer memory 2047 to the buffer unit 520 of the rewritable non-volatile memory chip 206 by using a first data transmitting command, the memory management circuit 2043 generates a writing complete message to the host system 2000, so as to accelerate a speed of replying the host system 2000.

In step S930, the rewritable non-volatile memory chip 206 programs the first data in the buffer unit 520 to a first physical block in response to a command of the memory management circuit 2043.

In step S940, it is determined whether the rewritable non-volatile memory chip 206 is failed to program the first data.

If the data program failure is not occurred, it represents that the first data has been correctly programmed into the first physical block, and the flow of the method for programming data of the present embodiment is ended. However, if the data program failure is occurred, in step S950, the memory management circuit 2043 commands the rewritable non-volatile memory chip 206 to program the first data maintained in the buffer unit 520 to a second physical block by using a second data transmitting command. In the present exemplary embodiment, the first data transmitting command is different to the second data transmitting command, and the second data transmitting command does not clear the first data in the buffer unit 520.

In another exemplary embodiment, in step S960, the rewritable non-volatile memory chip 206 programs all valid data in the first physical block and the first data programmed to the second physical block all together to a third physical block. By now, the flow of the method for programming data is ended.

In summary, in the method for programming data, the memory controller and the memory storage device of the invention, when the data program failure is occurred, a special data transmitting command that does not clear the programming data temporarily stored in the buffer unit of the rewritable non-volatile memory chip is used to complete the data program operation of the programming data in the buffer unit. In this way, in case that a capacity of the buffer memory in the memory controller is not increased, both of the processing speed and cost are considered in dealing with the error occurred during the data program operation. However, the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for programming data, adapted to a memory storage device comprising a buffer memory and a rewritable non-volatile memory chip, wherein the rewritable non-volatile memory chip comprises a buffer unit and a plurality of physical blocks, the method for programming data comprising:
    temporarily storing first data received from a host system into the buffer memory;
    generating a writing complete message for replying to the host system in response to the first data stored in the buffer memory is transmitted to the buffer unit by using a first data transmitting command;
    programming the first data in the buffer unit to a first physical block of the physical blocks;
    determining whether the first data in the buffer unit is failed to be programmed to the first physical block;
    if a data program failure is detected, programming the first data maintained in the buffer unit to a second physical block of the physical blocks by using a second data transmitting command, wherein the first data transmitting command is different to the second data transmitting command, and the second data transmitting command does not clear the first data in the buffer unit;
    changing the rewritable non-volatile memory chip to be in a busy state in response to that the first data in the buffer memory is transmitted to the buffer unit;
    temporarily storing a second data received from the host system to the buffer memory while the rewritable non-volatile memory chip is in the busy state, and waiting for the rewritable non-volatile memory chip to leave the busy state; and
    transmitting the second data in the buffer memory to the buffer unit by using the first data transmitting command in response to the rewritable non-volatile memory chip leaving the busy state.

2. The method for programming data as claimed in claim 1, wherein the data program failure refers to program failure of a physical page.

3. The method for programming data as claimed in claim 1, wherein after the step of programming the first data maintained in the buffer unit to the second physical block, the method further comprises:
    programming at least one valid data in the first physical block and the first data programmed to the second physical block to a third physical block of the physical blocks, wherein the at least one valid data is data programmed to the first physical block before the first data is programmed to the first physical block.

4. The method for programming data as claimed in claim 1, wherein the first data transmitting command is used to first clear data stored in the buffer unit, and then transmit the first data to the buffer unit.

5. The method for programming data as claimed in claim 1, wherein after the first data in the buffer memory is transmitted to the buffer unit, the method further comprises:
    clearing the buffer memory.

6. A memory controller, adapted to manage a rewritable non-volatile memory chip in a memory storage device, the memory controller comprising:
    a host system interface, configured to couple to a host system;
    a memory interface, configured to couple to the rewritable non-volatile memory chip, wherein the rewritable non-volatile memory chip comprises a buffer unit and a plurality of physical blocks;
    a buffer memory; and
    a memory management circuit, coupled to the host system interface, the memory interface and the buffer memory, configured to temporarily stores first data received from the host system into the buffer memory, transmits the first data in the buffer memory to the buffer unit by using a first data transmitting command, and controls the rewritable non-volatile memory chip to program the first data in the buffer unit to a first physical block of the physical blocks, wherein the memory management circuit generates a writing complete message for replying to the host system in response to the first data is transmitted to the buffer unit,
    if the memory management circuit receives a program failure message from the rewritable non-volatile memory chip during the rewritable non-volatile memory chip programming the first data in the buffer unit to the first physical block, the memory management circuit controls the rewritable non-volatile memory chip to program the first data maintained in the buffer unit to a second physical block of the physical blocks by using a second data transmitting command, wherein the first data transmitting command is different to the second data transmitting command, and the second data transmitting command does not clear the first data in the buffer unit,
    wherein the memory management circuit is further configured to change the rewritable non-volatile memory chip to be in a busy state in response to that the first data in the buffer memory is transmitted to the buffer unit, wherein the memory management circuit is further configured to temporarily store a second data received from the host system to the buffer memory while the rewritable non-volatile memory chip is in the busy state and wait for the rewritable non-volatile memory chip to leave the busy state, wherein the memory management circuit is further configured to transmit the second data in the buffer memory to the buffer unit by using the first data transmitting command in response to the rewritable non-volatile memory chip leaving the busy state.

7. The memory controller as claimed in claim 6, wherein the data program failure refers to program failure of a physical page.

8. The memory controller as claimed in claim 6, wherein the memory management circuit controls the rewritable non-volatile memory chip to program at least one valid data in the first physical block and the first data programmed to the second physical block to a third physical block of the physical blocks, wherein the at least one valid data is data programmed to the first physical block before the first data is programmed to the first physical block.

9. The memory controller as claimed in claim 6, wherein the memory management circuit uses the first data transmitting command to first clear data stored in the buffer unit and then transmit the first data to the buffer unit.

10. The memory controller as claimed in claim 6, wherein the memory management circuit clears the buffer memory after transmitting the first data in the buffer memory to the buffer unit.

11. A memory storage device, comprising:
a rewritable non-volatile memory chip, comprising a buffer unit and a plurality of physical blocks;
a connector, configured to couple to a host system; and
a memory controller, coupled to the rewritable non-volatile memory chip and the connector, and comprising a buffer memory,
wherein the memory controller is used for temporarily storing first data received from the host system into the buffer memory, transmitting the first data stored in the buffer memory to the buffer unit by using a first data transmitting command, and controlling the rewritable non-volatile memory chip to program the first data in the buffer unit to a first physical block of the physical blocks, wherein the memory controller generates a writing complete message for replying to the host system in response to the first data is transmitted to the buffer unit, wherein the rewritable non-volatile memory chip determines whether a data program failure is occurred during programming the first data in the buffer unit to the first physical block, if yes, the memory controller controls the rewritable non-volatile memory chip to program the first data maintained in the buffer unit to a second physical block of the physical blocks by using a second data transmitting command, wherein the first data transmitting command is different to the second data transmitting command, and the second data transmitting command does not clear the first data in the buffer unit, wherein the memory controller is further configured to change the rewritable non-volatile memory chip to be in a busy state in response to that the first data in the buffer memory is transmitted to the buffer unit, wherein the memory controller is further configured to temporarily store a second data received from the host system to the buffer memory while the rewritable non-volatile memory chip is in the busy state and wait for the rewritable non-volatile memory chip to leave the busy state, wherein the memory controller is further configured to transmit the second data in the buffer memory to the buffer unit by using the first data transmitting command in response to the rewritable non-volatile memory chip leaving the busy state.

12. The memory storage device as claimed in claim 11, wherein the data program failure refers to program failure of a physical page.

13. The memory storage device as claimed in claim 11, wherein the memory controller controls the rewritable non-volatile memory chip to program at least one valid data in the first physical block and the first data programmed to the second physical block to a third physical block of the physical blocks, wherein the at least one valid data is data programmed to the first physical block before the first data is programmed to the first physical block.

14. The memory storage device as claimed in claim 11, wherein the memory controller uses the first data transmitting command to first clear data stored in the buffer unit and then transmit the first data to the buffer unit.

15. The memory storage device as claimed in claim 11, wherein the memory controller clears the buffer memory after transmitting the first data in the buffer memory to the buffer unit.

* * * * *